United States Patent [19]

Janssen et al.

[11] Patent Number: 5,398,532
[45] Date of Patent: Mar. 21, 1995

[54] MODULAR WIRING HARNESS FOR ELECTRONIC VEHICLE IGNITION LOCK

[75] Inventors: David C. Janssen, Whitefish Bay; Vilnis Gagainis, Mequon, both of Wis.

[73] Assignee: Briggs & Stratton Corporation, Milwaukee, Wis.

[21] Appl. No.: 4,794

[22] Filed: Jan. 14, 1993

[51] Int. Cl.$^6$ ............................................. B60R 25/02
[52] U.S. Cl. ........................................ 70/252; 70/278; 70/DIG. 30; 70/DIG. 46; 307/10.2; 439/456
[58] Field of Search ................ 70/237, 252, 395, 405, 70/407–409, 413, 277, 278, DIG. 30, DIG. 46; 307/10.2–10.5; 439/456–460; 200/43.04–43.07; 29/451, 461, 439; 340/825.31

[56] References Cited

U.S. PATENT DOCUMENTS

| | | | |
|---|---|---|---|
| 2,443,977 | 6/1948 | Childress | 70/237 X |
| 2,564,159 | 8/1951 | Greacen, Jr. | 439/456 X |
| 2,846,530 | 8/1958 | Wintriss | 200/43.05 X |
| 3,660,624 | 5/1972 | Bell | 70/DIG. 46 X |
| 3,959,613 | 5/1976 | Gerber | 307/10.3 X |
| 4,815,837 | 3/1989 | Kikuchi et al. | 439/456 X |
| 4,938,043 | 7/1990 | Burr | 70/252 |
| 5,003,801 | 4/1991 | Stinar et al. | 70/278 |
| 5,043,593 | 8/1991 | Tsutsumi et al. | 307/10.2 |
| 5,086,288 | 2/1992 | Stramer | 307/10.3 X |
| 5,117,097 | 5/1992 | Kimura et al. | 70/278 X |
| 5,156,032 | 10/1992 | Edgar | 70/278 |

FOREIGN PATENT DOCUMENTS 4011179 1/1992 Japan ........................... 70/395

*Primary Examiner*—Peter M. Cuomo
*Assistant Examiner*—Suzanne L. Dino
*Attorney, Agent, or Firm*—Andrus, Sceales, Starke & Sawall

[57] ABSTRACT

A circuit module for a vehicle ignition lock. The circuit module houses a pair of electrical contacts on either side of a key way for closing a circuit between the contacts and a resistor provided in a key. The circuit module includes a cover and base adapted to be secured to one another for enveloping and securely holding a wire set within the module and for positioning the contacts in proper alignment with the key way. The circuit module is adapted to fit into a cylindrical cavity provided in a bezel of the lock.

19 Claims, 3 Drawing Sheets

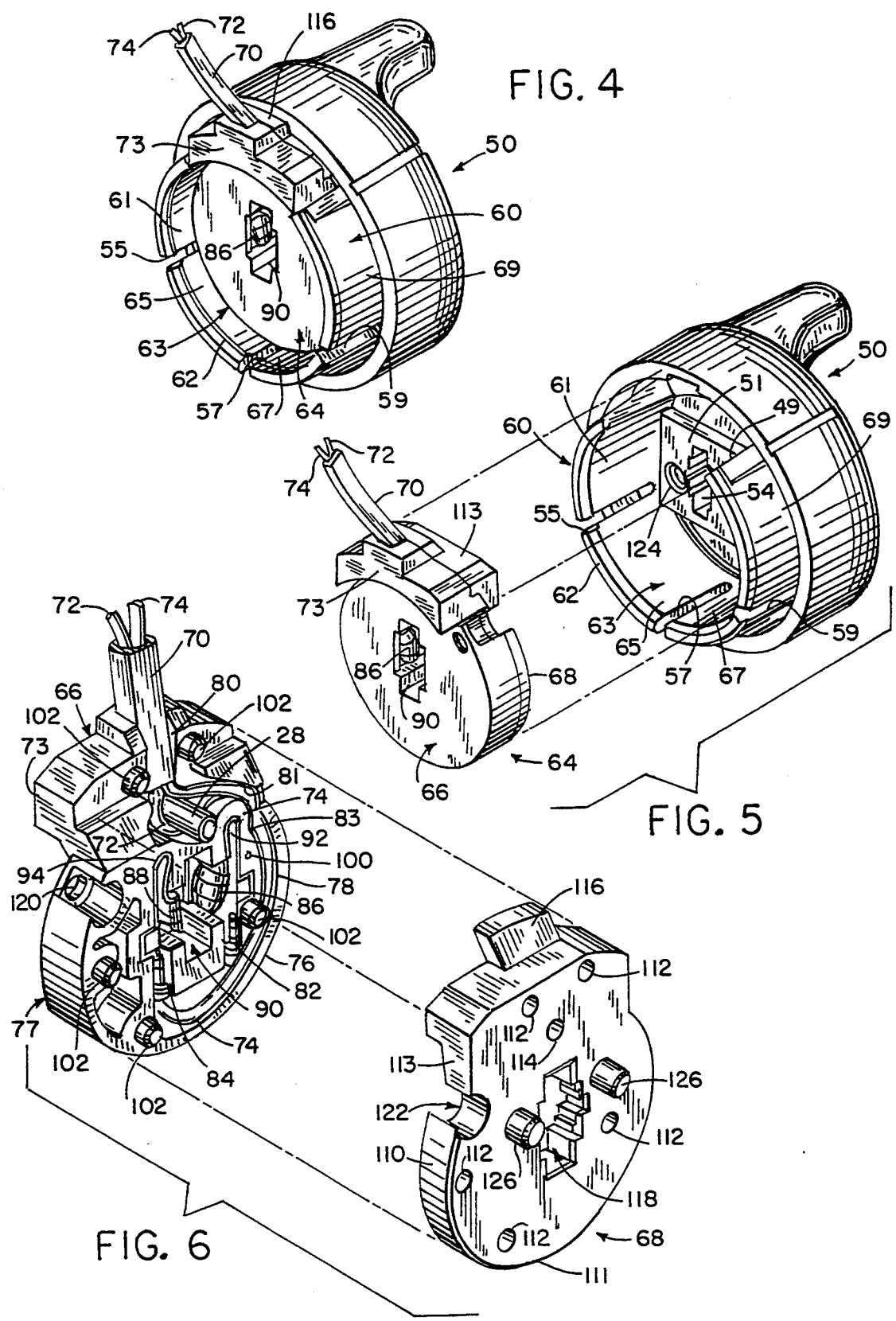

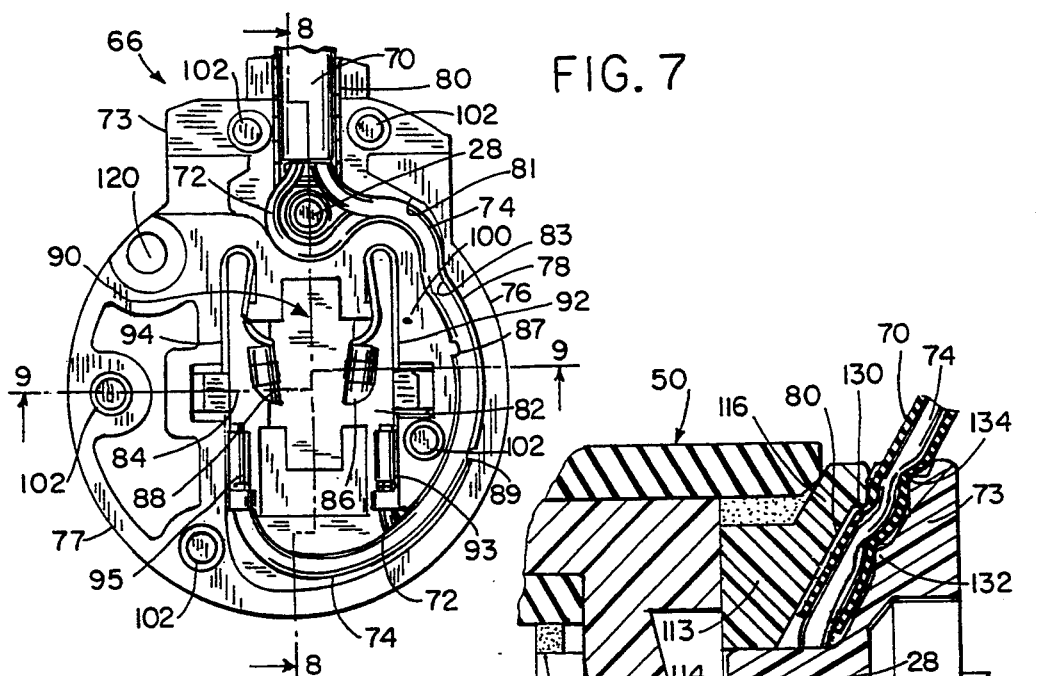
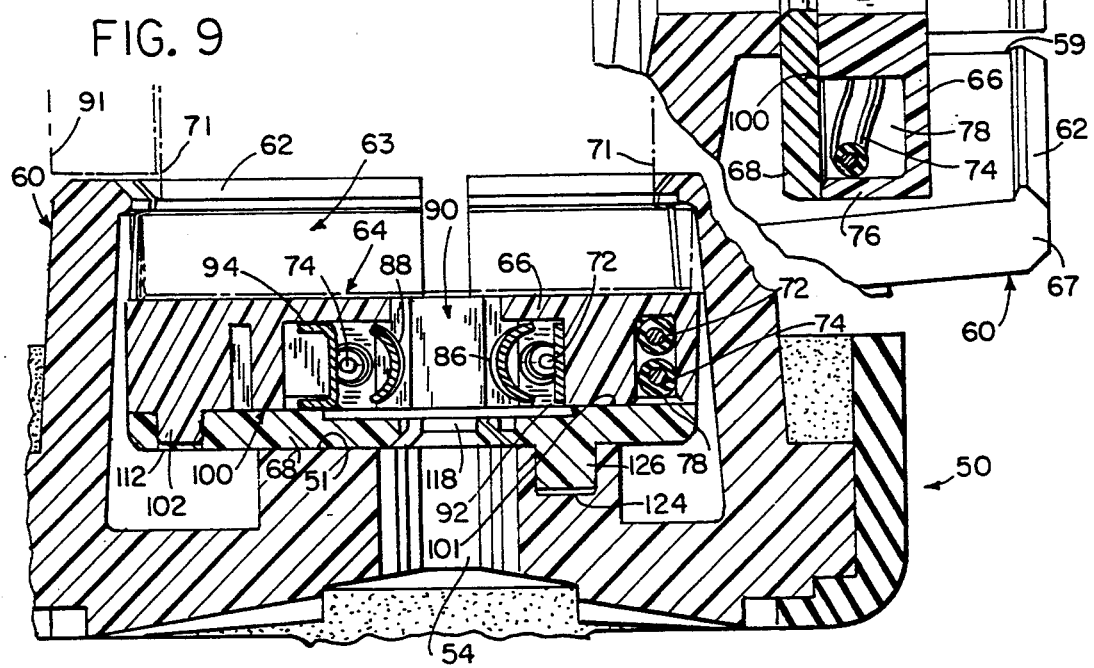

MODULAR WIRING HARNESS FOR ELECTRONIC VEHICLE IGNITION LOCK

BACKGROUND OF THE INVENTION

1. Field of the Invention

This invention is generally related to vehicle ignition locks and is directed to a rotatable ignition lock having an electrical interlock.

2. Description of the Prior Art

The development of numerous different electronic VATS systems for an automobile has taken place over the years. One such system incorporates the use of a resistor pellet in an ignition key. The pellet provides for a resistor of known value so that upon insertion and rotation of the key in the automobile's ignition cylinder an electric current is applied to the resistor. A decoder circuit performs a resistance comparison between the pellet in the key and a known resistance "window." If the resistance is within the window, the automobile may be started. If the resistance does not match, the automobile will not start.

Typically, a vehicle ignition lock includes a cylinder rotatable within a hollow sleeve both of which extend into the steering column of a vehicle. A bezel or end cap is attached to the outer end of the cylinder and is located on the exterior of the steering column. The bezel includes a key slot or key way adapted for receiving the ignition key. It has been found that the inside surface of the bezel between the bezel and the outer end of the cylinder is a convenient location for mounting the electrical contacts that engage the key resistor pellet which complete the resistor pellet circuit when the key is fully inserted in the key way.

In the prior art, the contacts were placed on a base and held in position by a cover. A wiring harness consisting of a pair of wires attached to the contacts for completing the electrical circuit extended through the cover and were carried down the vehicle steering column to a remote position in the vehicle. The prior art wiring harness and contact carrier comprised a pair of contacts mounted directly on the end of a pair of wires at the end of the harness. The wires and contacts were clamped into place by positioning the cover over the bezel. The cover and bezel were then secured to the outer end of the ignition lock cylinder.

A disadvantage of the prior art systems for mounting the contacts in the bezel was the failure to securely position the wires in place, potentially causing a fatigue failure at the contact crimp area. A further disadvantage to the prior art system is the way the wires are clamped between the cover and the base, permitting the wires to move relative to the base, further increasing instability and potentially causing wear points on the wires and a fatigue failure. Yet another disadvantage is the potential improper positioning of the wires during assembly, causing damaged, pinched or broken wires.

SUMMARY OF THE INVENTION

The subject invention is directed to an improved circuit module and wiring harness wherein the circuit module includes a base having a wire way for securely maintaining the harness wires in position. A cover is adapted to be mounted on the base in such a manner as to securely hold both the wires and the contacts in position. In addition, the cover and base define a channel for holding and clamping the wires in position in the module, minimizing wear points and the potential for breaking the wires, reducing the likelihood of creating an open circuit condition. It has been found that the circuit module and wiring harness of the subject invention greatly improves the reliability of the electronic interlock for the ignition system.

In the preferred embodiment of the invention, the circuit module and wiring harness include a base having an integral molded wire way for receiving the wires and a key slot in alignment with the common key slot of the bezel and a cavity on either side of the key slot adapted for receiving and carrying the electrical contacts. The cover conforms substantially to the base and is adapted to be placed in covering relationship therewith for enclosing the wires and the contacts. The cover includes a key slot in alignment with the key slot of the base and bezel, and further includes a clamping arrangement for specifically maintaining the wires in position in the wire way provided in the base.

A plurality of mated posts and sockets are used for accurately positioning the cover on the base to assure a good and secure fit during assembly.

In the preferred embodiment of the invention, the bezel includes a plurality of rearwardly projecting, arcuate-shaped, resilient walls having an inner diameter conforming substantially to but slightly larger than the perimeter of the base. The outer end of each wall includes a protruding lip or ridge which may be forced outwardly as the circuit module is positioned in the bezel and will resiliently return to their normal positions to capture and contain the circuit module and wiring harness on the bezel.

It is, therefore, an object and feature of the subject invention to provide for a circuit module and wiring harness for electrical contacts adapted to be placed on opposite sides of the key slot in a vehicle ignition.

It is another object and feature of the subject invention to provide a circuit module and wiring harness wherein the wire set in the module is held in a secure position within the module and clamped in position with a minimum risk of breaking the wires to minimize the potential for an open circuit condition.

It is yet another object and feature of the subject invention to provide a circuit module and wiring harness, wherein the circuit module is adapted to be snapped into multiple bezel designs.

Other objects and features of the invention will be readily apparent from the accompanying drawings and description of the preferred embodiment.

BRIEF DESCRIPTION OF THE DRAWINGS

The drawings illustrate the best mode presently contemplated of carrying out the invention.

FIG. 4 rear perspective view of a bezel shown in FIG. 3, with the wiring harness and circuit module installed therein.

FIG. 5 is an exploded perspective view showing the wiring harness and circuit module removed from the bezel.

FIG. 6 s an exploded perspective view of the wiring harness and circuit module of the subject invention.

FIG. 7 is a plan view of the base of the circuit module of FIG. 6.

FIG. 8 is a section view of the base of the circuit module taken generally along the line 8—8 of FIG. 7, and further illustrating in section the cover of the module as well as a portion of the bezel.

FIG. 9 is a section view of the base, cover and bezel similar to FIG. 8 but taken generally along the line 9—9 of FIG. 7, and further illustrating in phantom a portion of a cylinder and sleeve of a vehicle ignition lock.

DETAILED DESCRIPTION OF THE PREFERRED EMBODIMENT

Figure 1:
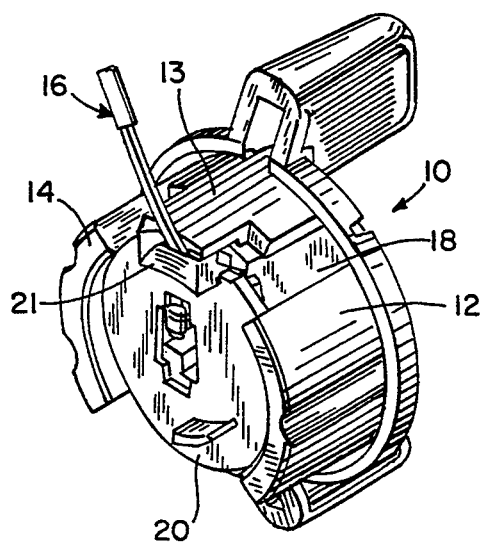
FIG. 1 is a rear perspective view and FIG. 2 is an exploded view of a vehicle ignition lock bezel and wiring harness of the prior art.
Figure 2:
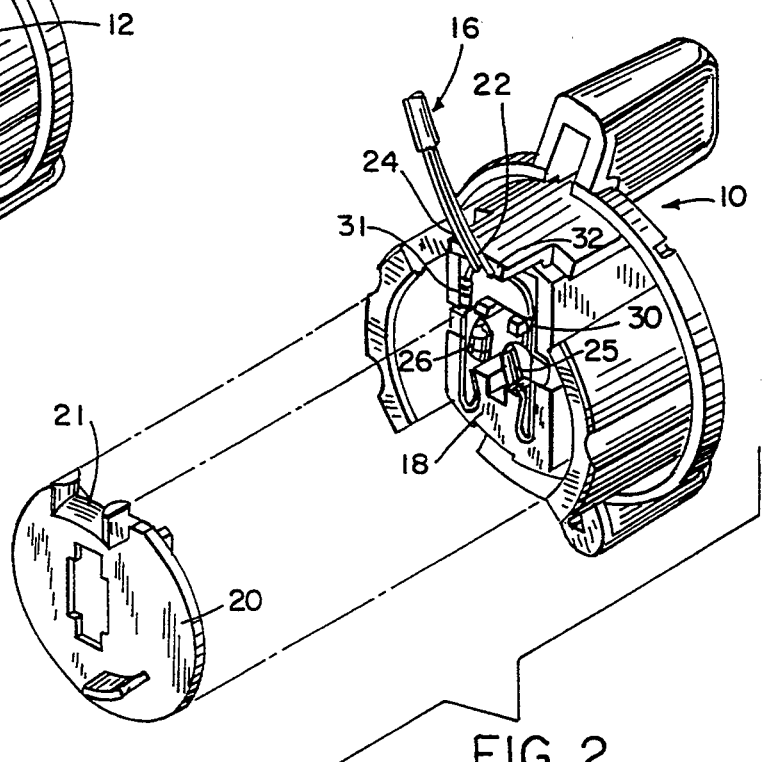

A prior art bezel, wiring harness and circuit module system is shown in FIGS. 1 and 2. As there shown, a bezel 10 includes a rearwardly projecting annular skirt which is sectioned into three arcuate-shaped walls 12, 13 and 14. The walls 12 and 14 are adapted to snap on the outer end of a cylinder of a vehicle ignition lock (not shown), and wall 13 functions as a guide and cover for wiring system 16. The bezel 10 includes a raised base 18 for carrying the wires and contacts for a wiring system 16. As shown in FIG. 2, the system 16 is connected to bezel 10 by base 18 and a cover 20. System 16 has a pair of wires 22 and 24 inset into the surface of base 18 and connected to a pair of electrical contacts 25 and 26 respectively located on either side of the key way in bezel 10. A pair of crimps 30 and 31 secure the wires 22 and 24 respectively to base 18. The wires 22 and 24 extend out from base 18 between wall 13 and recess 21 in cover 20 into the interior of a steering column (not shown). The cover 16 maintains the wires 22 and 24 and contacts 25 and 26 in place when cover 16 is sandwiched between base 18 and the outer end of the cylinder during assembly.

Figure 3:
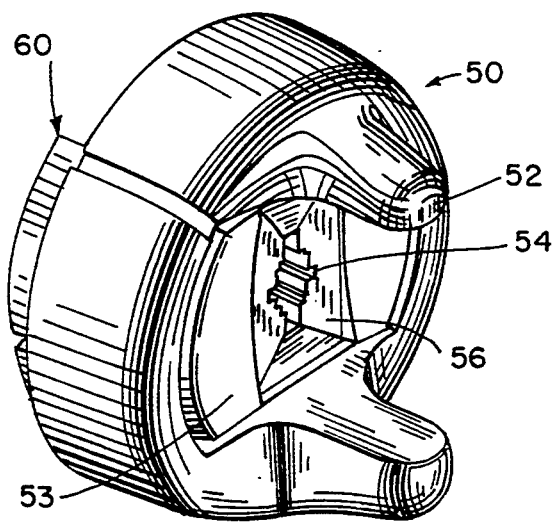
FIG. 3 is a front perspective view of a bezel made in accordance with the subject invention.

An improved bezel 50, circuit module 64 and wiring harness 70 combination is shown in FIGS. 3-9. FIG. 3 illustrates the front face of bezel 50. As is specifically shown in FIG. 3, the improved bezel 50 of the subject invention includes an outer housing 52, an inner core 53 made of a hard, relatively rigid material and a key way 54 in its center. The area 56 surrounding the key way is part of the hardened core 53 and tapers inwardly toward the key way 54. This assures that the tip of a key will not damage the soft resilient outer housing 52 as the key is inserted into key way 54 by providing a hardened pad in the immediate vicinity of key way 54.

FIG. 4 illustrates the rear side of bezel 50. As is shown in FIG. 4, bezel 50 includes a rearwardly projecting annular skirt 60 which is sectioned by three slots 55, 57 and 59 into four arcuate-shaped walls 61, 65, 67 and 69. The walls 61, 65, 67 and 69 define a cylindrical cavity 63 on the interior of bezel 50. Bezel 50 also includes a support surface 51 that engages and supports circuit module 64 when received within cavity 63. Skirt 60 also includes a notch 49 defined by the edges of walls 61 and 69 for properly positioning circuit module 64 in cavity 63, as will hereinafter be described. The outer edge of each wall of skirt 60 includes an inwardly projecting rim or lip 62. The walls of skirt 60 are made of a resilient, plastic material, whereby the circuit module 64 (FIG. 5) may be inserted into the cavity 63, with the outer perimeter of the circuit module 64 being slightly smaller than the inner diameter of the cylinder defined by the skirt 60. As the circuit module 64 is inserted into cavity 63, it will force the rims 62 and walls 61, 65, 67 and 69 outward, permitting module 64 to be fit into cavity 63. As shown best in FIG. 4, when module 64 is fully inserted within cavity 63 it is axially spaced from lips 62 so that module 64 does not interfere with the snap fit of the bezel 50 via lips 62 on the outer end of a cylinder 71 of a vehicle ignition lock, as shown in phantom in FIG. 9.

As is conventional, cylinder 71 rotates within a stationary cylindrical hollow sleeve 91 which is mounted to the steering column of a vehicle. Sleeve 91 is also shown in phantom in FIG. 9. A key (not shown) includes an electrical component, preferably a resistor, which is adapted to engage a pair of contacts 86 and 88 for closing a decoder control circuit when the key is fully inserted within key way 54. The key is preferably of the type illustrated and described in U.S. Pat. No. 5,156,032, the specification of which is specifically incorporated herein by reference.

As is shown in FIGS. 5-9, the circuit module 64 includes a base 66 and a cover 68. A wiring harness 70 projects from the module 64 and includes a wire set having two wires 72 and 74 which may be routed from bezel 50 down the steering column of a vehicle to a remote location for carrying current through a resistor in an ignition key to the ignition control system. The base 66 includes a fiat circular body portion 77 defined by a circular-shaped outer perimeter wall 76 and an upstanding outwardly projecting neck portion 73.

As shown best in FIG. 7, base 66 includes a wire way that receives, holds and immobilizes wires 72 and 74. The wire way functions to stabilize and secure wires 72 and 74 against longitudinal and/or vibrational movements by providing a tortuous path for wires 72 and 74 in order to minimize the potential for fatigue failures or other damage to wires 72 and 74. The wire way is comprised of a first straight channel 80, a short arcuate-shaped second channel 81, a reverse-bend third channel portion 83, and a long arcuate-shaped fourth channel 78. The wire way terminates at a pair of spaced, parallel cavities 82 and 84 located on opposite sides of key way 90 in base 66. As shown in FIG. 6, straight channel 80 is provided in the neck 73 of base 66 for receiving the wiring harness 70. Channel 80 extends transversely of an axis 75 (see FIG. 8), defined by the direction of movement of a key in key way 90, and at an inclined angle of about 30° from a vertical line running through that same axis 75. At the lower end of channel 80 is an upstanding post 28. The wires 72 and 74 are separated by post 28 and wire 72 is looped around post 28, as shown, just prior to entering the channel 81 (see FIG. 7). Channel 81 is relatively short in length, and has a radius of curvature that is substantially smaller than the radius of curvature for channel 78. Channel 81 leads to a reverse bend portion 83 which in turn leads to channel 78. Portion 83 functions as an offset to inhibit longitudinal movement of wires 72 and 74. Portion 83 leads into Channel 78 which in turn opens into cavities 82 and 84. Thus, channels 78 and 81 force wires 72 and 74 to bend in a concave direction with respect to key way 90 while portion 83 forces wires 72 and 74 to bend in a convex direction. A pair of spaced bosses 87 and 89 constrict channel 78 to further aid in retaining wires 72 and 74 within channel 78. As shown best in FIG. 7, boss 87 projects into channel 78 from the inner diameter of channel 78 while boss 89 projects into channel 78 from the outer diameter of channel 78. Bosses 87 and 89 thus also function to aid in preventing any movement of wires 72 and 74 after wires 72 and 74 are inserted into channel 78. The tortuous path thus provided by the wire way substantially inhibits any movement of wires 72 and 74 in base 66.

A pair of electrical contacts 86 and 88 are adapted to be placed in the cavities 82 and 84 and are in communication with the key way 90 in base 66. In the preferred embodiment, each contact 86, 88 includes an electrical conductor spring clip 92 and 94, respectively, for mounting contacts 86 and 88, respectively, in the elongated cavities 82 and 84. As shown best in FIGS. 6 and 7, spring clip 92 is connected at one end to wire 72 by a crimp connection 93 and at its other end to contact 86 while spring clip 94 is connected to wire 74 by crimp connection 95 at one end and to contact 88 at its other end.

Surface 100 of base 66 is above the wires 72, 74, the spring clips 92 and 94 and the contacts 86 and 88, providing a substantially flat upper surface on base 66 (see also FIG. 9, shown inverted). A plurality of locator posts 102 project outwardly from flat surface 100 of base 66 and provide mounting means for receiving cover 68. As is also shown In FIG. 6, cover 68 includes a flat circular body portion 111 defined by a circular-shaped outer perimeter wall 110 conforming substantially to perimeter wall 76 of the base 66, and an upstanding outwardly projecting neck portion 113 conforming substantially to neck portion 73 of base 66. A plurality of mounting holes 112 are provided in cover 68 for receiving each of the mounting posts 102 for aligning cover 68 with base 66. There is also provided a hole 114 which is a mounting hole for receiving the wire guide post 28. A projecting tab 116 on neck portion 113 is provided and serves together with neck portion 113 as a cover for covering channel 80 through which wiring harness 70 extends. A key way 118 in cover 68 conforms to and is aligned with key way 90 in base 66 and common key way 54 in bezel 50. A mounting hole 120 is provided in base 66 and is in alignment with a slot 122 in cover 68. Hole 120 provides a clearance for a push button (not shown) when a push button type bezel is required. A pair of spaced mounting posts 126 located on opposite sides of key way 118 extend outwardly from cover 68 and are adapted to be received in a pair of corresponding mounting holes 124 provided in bezel 50.

Cover 68 is adapted to be placed on base 66 for securing the wire set comprising wires 72 and 74, spring clips 92 and 94 and electrical contacts 86 and 88 in channels 78, 80, 81, 82, 83 and 84 provided in base 66. As is shown in FIGS. 8 and 9, when cover 68 is placed on base 66, it confines wires 74 and 72 in the wire way provided in base 66 of the module. The post 28 is adapted to loop wire 72 around it allowing wires 72 and 74 to be cut to equal length. As particularly shown in FIG. 8, the tab 116 on neck portion 113 of cover 68 includes an outwardly projecting ridge or rib 130 near its upper end. The neck portion 73 of base 66 includes a pair of spaced ribs 132 and 134 positioned on either side of and projecting in a direction parallel to rib 130. When base 66 and cover 68 are assembled, as shown, the ribs 130, 132 and 134 crimp and firmly engage the wiring harness 70 for holding or clamping the wiring harness 70 in position in channel 80, assuring that it will not move relative to channel 80 or with respect to module 64. This also assures a good electrical connection and reduces the likelihood of damage resulting from the movement of the wiring harness 70 to create an open circuit condition. The cover 68 may be sonic welded to base 66, or otherwise suitably secured to provide a permanent assembly.

As is better shown in FIG. 9, the projecting posts 126 from cover 68 are received in sockets 124 provided in surface 51 of bezel 50 for aligning key way 118 with the common key way 54 in bezel 50. Notch 49 (FIG. 5) also functions to properly position and align circuit module 64 with respect to bezel 50 by receiving neck portions 73 and 113 to prevent any rotation of circuit module 64 within cavity 63. This assures proper positioning of contacts 86 and 88 with respect to a key inserted through bezel 50 each and every time the key is inserted in key way 54. When assembled, surface 100 of base 66 and surface 101 of cover 68 mate or engage with one another to provide a tightly fitting module 64 for securely holding the circuit components in position. As noted above, base 66 and cover 68 are preferably sonic welded to form a permanent assembly.

While certain objects and features of the invention have been described herein, it will be readily understood that the invention includes all modifications and enhancements within the scope and spirit of the following claims.

What is claimed is:

1. A circuit module assembly for mounting electrical contacts adapted to be placed on opposite sides of a key way in a lock having a stationary sleeve and a rotatable cylinder in the sleeve, the cylinder including a key way for receiving a key, the key including an electrical component adapted for engaging the electrical contacts and closing a control circuit when the key is fully inserted in the key way, the circuit module assembly comprising:

a. a flat base having opposite sides and including a key way and a pair of cavities, one cavity formed on each side of the key way in one of said sides, each cavity opening into the key way and adapted for receiving and carrying an electrical contact which communicates with the key way in the base;

b. an electrical wire set having opposite ends, one of said ends received in said base and adapted to be electrically coupled to the electrical contacts and the other of said ends projecting from said base and adapted to be connected to the control circuit;

c. a cover dimensioned to conform substantially to the base and adapted to be placed in covering relationship with the base for mounting the wire set and the contacts in the base, the cover including a key way in alignment with the key way of said base;

d. a wire way formed in one side of said base for receiving and preventing movement of said wire set with respect to said base, said wire way communicating at one end with said cavities and at its other end exteriorly of said base;

e. a bezel mounted on one end of the cylinder and including a cavity dimensioned to receive said base and said cover placed in covering relationship with said base, said bezel and the cylinder having a common key way; and f. means for mounting said base and said cover placed in covering relationship with said base in said cavity of the bezel.

2. The circuit module of claim 1 wherein said wire way includes an arcuate-shaped long channel formed concavely with respect to the key way of said base.

3. The circuit module of claim 2 wherein said wire way further includes an arcuate-shaped short channel formed concavely with respect to the key way of said base, said short channel having a radius of curvature less than the radius of curvature of said long channel.

4. The circuit module of claim 3 wherein said wire way further includes an arcuate-shaped reverse bend portion disposed between said short and long channels, said reverse bend portion formed convexly with respect to the key way of said base.

5. The circuit module of claim 2 wherein said base includes a projecting neck portion, said wire way further includes a straight channel formed in said neck portion and communicating with said long channel, and said cover includes a neck portion enclosing said straight channel.

6. The circuit module of claim 5 further including clamping means for clamping said wire set in said straight channel.

7. The circuit module of claim 6 wherein said clamping means comprises crimp means for crimping said wire set in said straight channel.

8. The circuit module of claim 3 wherein the wire set includes two parallel wires and wherein the base includes an upstanding post projecting from said one side of said base and disposed in the path of the wire way for separating and positioning the wires prior to entering said short channel.

9. The circuit module of claim 8, wherein the cover includes a socket adapted for receiving the post.

10. The circuit module of claim 1, wherein one of said base and cover includes a plurality of upstanding locator pins, and wherein the other of said base and cover includes a plurality of complementary sockets adapted for receiving the pins for accurately positioning the cover on the base.

11. The circuit module of claim 2 wherein said base includes a push button receiving hole formed therein, and said cover includes a push button receiving slot, said hole and slot aligned to receive a push button therein.

12. The circuit module of claim 2 wherein said long channel further includes retaining means for retaining said wire set therein.

13. The circuit module of claim 12 wherein said retaining means comprises at least one boss projecting into said long channel.

14. A vehicle ignition lock having a stationary sleeve, a rotatable cylinder in the sleeve, a bezel mounted on one end of the cylinder, said bezel includes a module-receiving cylindrical cavity formed therein, and said bezel and cylinder including a common key way for receiving a key, said key including an electrical component adapted for engaging a pair of electrical contacts to close a decoder circuit when the key is fully inserted in the key way, a circuit module carrying said electrical contacts so as to be disposed on opposite sides of the key way, and mounting means for snap-fitting said one end of said cylinder to said bezel and simultaneously snap-fitting said circuit module within said cavity between said one end of said cylinder and said bezel.

15. The lock of claim 14 wherein said mounting means comprises an annular skirt extending rearwardly from said module-receiving cavity, said skirt including a plurality of slots defining a plurality of arcuate-shaped walls each having an outer end including an inwardly projecting lip, said walls being composed of a resilient material wherein the walls provide a snap-in mounting for said module and cylinder.

16. The lock of claim 15 further including positioning means for aligning said circuit module with the key way in said bezel to properly position said electrical contacts on opposite sides of said key way.

17. The lock of claim 16 wherein said circuit module includes a generally circular body portion dimensioned to be received within said cylindrical cavity in said bezel and a neck portion projecting from said body portion, and said positioning means comprises a notch formed in said annular skirt for receiving said neck portion of said circuit module.

18. The lock of claim 17 wherein said bezel includes a support surface engageable with said circuit module and said positioning means further includes a plurality of spaced locator pins projecting from one of said circuit module and said support surface, and a plurality of complementary pin-receiving sockets formed in the other of said circuit module and support surface.

19. A circuit module for mounting electrical contacts adapted to be placed on opposite sides of a key way in a lock having a stationary sleeve, a rotatable cylinder in the sleeve and a bezel mounted on one end of the cylinder, the bezel and the cylinder including a common key way for receiving a key, the key including an electrical component adapted for engaging the electrical contacts and closing a control circuit when the key is fully inserted in the key way, the circuit module comprising:

a. a flat base having opposite sides and including a key way, a push button receiving hole formed therein, and a pair of cavities, one cavity formed on each side of the key way in one of said sides, each cavity opening into the key way and adapted for receiving and carrying an electrical contact;

b. an electrical wire set having opposite ends, one of said ends received in said base and adapted to be electrically coupled to the electrical contacts and the other of said ends projecting from said base and adapted to be connected to the control circuit;

c. a cover dimensioned to conform substantially to said base and adapted to be placed in covering relationship with said base for mounting said wire set and the contacts in said base, said cover including a key way in alignment with the key way of said base, and including a push button receiving slot, said push button receiving hole and said push button receiving slot aligned to receive a push button therein; and d. a wire way including an arcuate shaped long channel formed concavely with respect to the key way of said base, the wire way formed in one side of said base for receiving and preventing movement of said wire set with respect to said base, and said wire way communicating at one end with said cavities and at its other end exteriorly of said base.

* * * * *